(12) United States Patent  
Zamir et al.

(10) Patent No.: US 8,548,991 B1  
(45) Date of Patent: Oct. 1, 2013

(54) PERSONALIZED BROWSING ACTIVITY DISPLAYS

(75) Inventors: Oren Zamir, Los Altos, CA (US); Jeffrey Korn, New York, NY (US)

(73) Assignee: Google Inc., Mountain View, CA (US)

( * ) Notice: Subject to any disclaimer, the term of this patent is extended or adjusted under 35 U.S.C. 154(b) by 514 days.

(21) Appl. No.: 11/536,779

(22) Filed: Sep. 29, 2006

(51) Int. Cl.
 *G06F 7/00* (2006.01)
 *G06F 17/30* (2006.01)

(52) U.S. Cl.
 USPC .................... 707/723; 707/725; 707/727

(58) Field of Classification Search
 USPC .................... 707/2, 727, 732, 722–723
 See application file for complete search history.

(56) References Cited

U.S. PATENT DOCUMENTS

| | | | | |
|---|---|---|---|---|
| 5,787,253 A * | 7/1998 | McCreery et al. | | 709/231 |
| 5,961,598 A * | 10/1999 | Sime | | 709/224 |
| 6,006,222 A * | 12/1999 | Culliss | | 1/1 |
| 6,182,068 B1 * | 1/2001 | Culliss | | 707/721 |
| 6,285,999 B1 | 9/2001 | Page | | |
| 6,321,228 B1 * | 11/2001 | Crandall et al. | | 707/10 |
| 6,434,745 B1 * | 8/2002 | Conley et al. | | 717/177 |
| 6,667,751 B1 * | 12/2003 | Wynn et al. | | 715/833 |
| 6,684,250 B2 * | 1/2004 | Anderson et al. | | 709/225 |
| 7,031,961 B2 * | 4/2006 | Pitkow et al. | | 707/4 |
| 7,398,271 B1 * | 7/2008 | Borkovsky et al. | | 1/1 |
| 7,565,367 B2 * | 7/2009 | Barrett et al. | | 1/1 |
| 7,631,007 B2 * | 12/2009 | Morris | | 709/224 |
| 7,783,632 B2 * | 8/2010 | Richardson et al. | | 707/727 |
| 7,831,548 B1 * | 11/2010 | Round et al. | | 707/609 |
| 7,921,109 B2 * | 4/2011 | Parikh et al. | | 707/731 |
| 8,001,118 B2 * | 8/2011 | Dean et al. | | 707/731 |
| 8,041,711 B2 * | 10/2011 | Walker et al. | | 707/723 |
| 2002/0186237 A1 * | 12/2002 | Bradley et al. | | 345/736 |
| 2004/0267815 A1 * | 12/2004 | De Mes | | 707/104.1 |
| 2005/0071741 A1 * | 3/2005 | Acharya et al. | | 715/500 |
| 2005/0102282 A1 * | 5/2005 | Linden | | 707/3 |
| 2006/0004711 A1 * | 1/2006 | Naam | | 707/3 |
| 2006/0047643 A1 * | 3/2006 | Chaman | | 707/3 |
| 2006/0123014 A1 * | 6/2006 | Ng | | 707/100 |
| 2006/0224587 A1 * | 10/2006 | Zamir et al. | | 707/7 |
| 2006/0224938 A1 * | 10/2006 | Fikes et al. | | 715/500 |
| 2006/0230058 A1 * | 10/2006 | Morris | | 707/102 |
| 2007/0100824 A1 * | 5/2007 | Richardson et al. | | 707/7 |
| 2007/0100992 A1 * | 5/2007 | Wong et al. | | 709/224 |
| 2007/0112730 A1 * | 5/2007 | Gulli et al. | | 707/3 |
| 2007/0244657 A1 * | 10/2007 | Drago et al. | | 702/81 |
| 2007/0250855 A1 * | 10/2007 | Quinn-Jacobs et al. | | 725/35 |
| 2007/0276790 A1 * | 11/2007 | Walsh et al. | | 707/2 |
| 2008/0189281 A1 * | 8/2008 | Cancel et al. | | 707/6 |

* cited by examiner

Primary Examiner — Jeffrey A Burke
(74) *Attorney, Agent, or Firm* — Harrity & Harrity, LLP

(57) ABSTRACT

A system records browsing activity of a user using a browser. The system determines browsing statistics from the recorded browsing activity and graphically displays the browsing statistics to the user via the browser.

42 Claims, 13 Drawing Sheets

PERSONALIZED BROWSING ACTIVITY DISPLAYS

BACKGROUND

1. Field of the Invention

Implementations described herein relate generally to document browsing and, more particularly, to accumulating and displaying document browsing activity to users via personalized displays.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are "hits" and are returned to the user as links. Each "hit" may be ranked by the search engine based on various factors, such as, for example, the relevance of the "hit" to the search query.

"Bookmarks" or "favorites" are typical ways for a browser executed at a client to remember documents (e.g., web pages) that a user has visited when browsing documents located on a network, such as, for example, the Internet. For example, a bookmark or a favorite may be used by a user to remember a search result obtained from the execution of a search by a search engine. Bookmarks or favorites permit the user to return to the bookmarked document easily.

SUMMARY

According to one aspect, a method may include recording sites or documents browsed by a user using a browser and analyzing the recorded sites or documents to produce user browsing statistics. The method may further include providing a document to the user via the browser that displays the user browsing statistics.

According to another aspect, a method may include recording browsing activity associated with a user and producing user browsing statistics based on the recorded browsing activity. The method may further include adjusting a ranking of search results provided to the user based on the user browsing statistics.

According to a further aspect, a method may include recording browsing activity of a user using a browser and determining browsing statistics from the recorded browsing activity. The method may further include graphically displaying the browsing statistics to the user via the browser.

BRIEF DESCRIPTION OF THE DRAWINGS

The accompanying drawings, which are incorporated in and constitute a part of this specification, illustrate one or more embodiments of the invention and, together with the description, explain aspects of the invention. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, a user's browsing activity may be tracked and a personalized display of the user's browsing activity may be provided to that user via a window, such as a pop-up window, provided by a toolbar associated with the user's browser. The personalized display of the user's browsing activity may graphically depict browsing activity by, for example, how frequently documents (e.g., URLs) or sites have been browsed by the user, which documents or sites have been browsed recently by the user, how frequently URLs or sites that correspond to the user's bookmarks or favorites have been browsed by the user, etc. In some implementations, the browsing activity may be analyzed to determine browsing statistics. The browsing statistics may be used in adjusting the ranking of search results provided to the user associated with the browsing statistics.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document. A "site" as the term is used herein is to be broadly interpreted to include a group of documents hosted by any type of entity. A "site" may include a group of documents under common control, such as a group of documents associated with an organization, a domain name, a host name, or a set of documents created by the same person or group of persons. A "site" may also include a group of documents about a particular topic, a group of documents in a particular language, a group of documents hosted in a particular country, or a group of documents written in a particular writing style.

Overview

Figure 1:
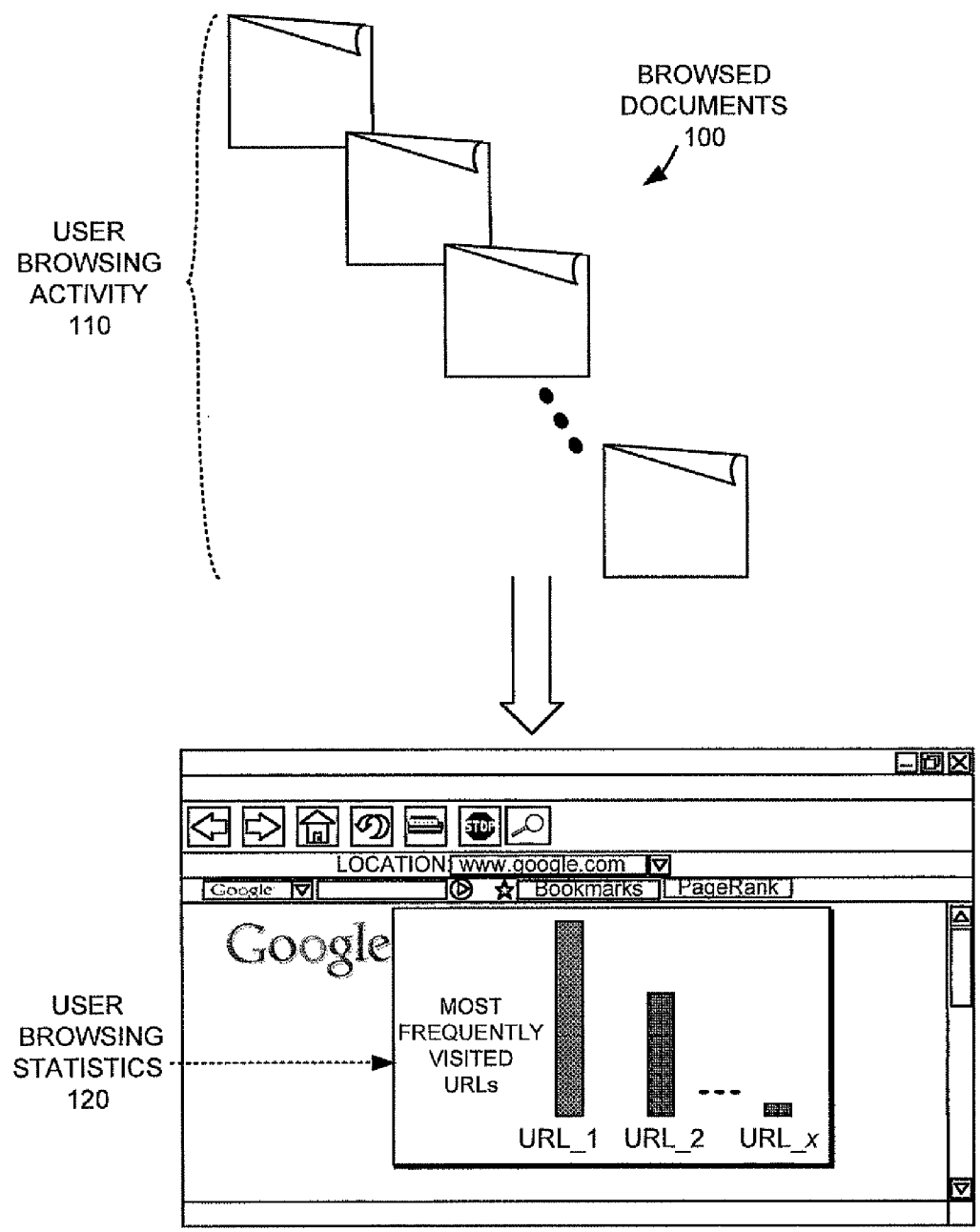
FIG. 1 is an exemplary diagram of an overview of an implementation described herein.

FIG. 1 illustrates an exemplary overview that tracks a user's browsing activity to determine the user's browsing statistics. The user's determined browsing statistics may be supplied to the user, or may be used in adjusting the ranking of search results provided to the user as the result of a document search. As shown in FIG. 1, a user, using a browser at a client (not shown), may browse multiple different documents 100. Such browsing may include, for example, selecting a document from a set of documents provided to the user as the result of a search executed by a search engine, user selection of a document from a set of bookmarked or "favorite" documents stored in the user's browser, or user entry of an address (e.g., a uniform resource locator (URL)) into the browser enabling the browser to access and load the document corresponding to the entered address.

The documents 100 browsed by the user may then be recorded as user browsing activity 110. The user browsing activity 110 may be analyzed to produce user browsing statistics 120. User browsing statistics 120 may be provided to the user via a "zeitgeist" that may include, for example, a window displayed in the user's browser (e.g., a pop-up window). The zeitgeist may be displayed automatically, at times selected by the user, or when the user performs a specific action. User browsing statistics 120 may include, for example, URLs/sites visited most frequently by the user, URLs/sites visited most frequently by the user that are included in the user's bookmarks, or URLs/sites visited recently by the user. User browsing statistics 120 may include statistics presented by day of week, by work day vs. non-work day, by month, by hours of the day, by cookie or user agent, or as a comparison to that of the average user.

Exemplary Network Configuration

Figure 2:
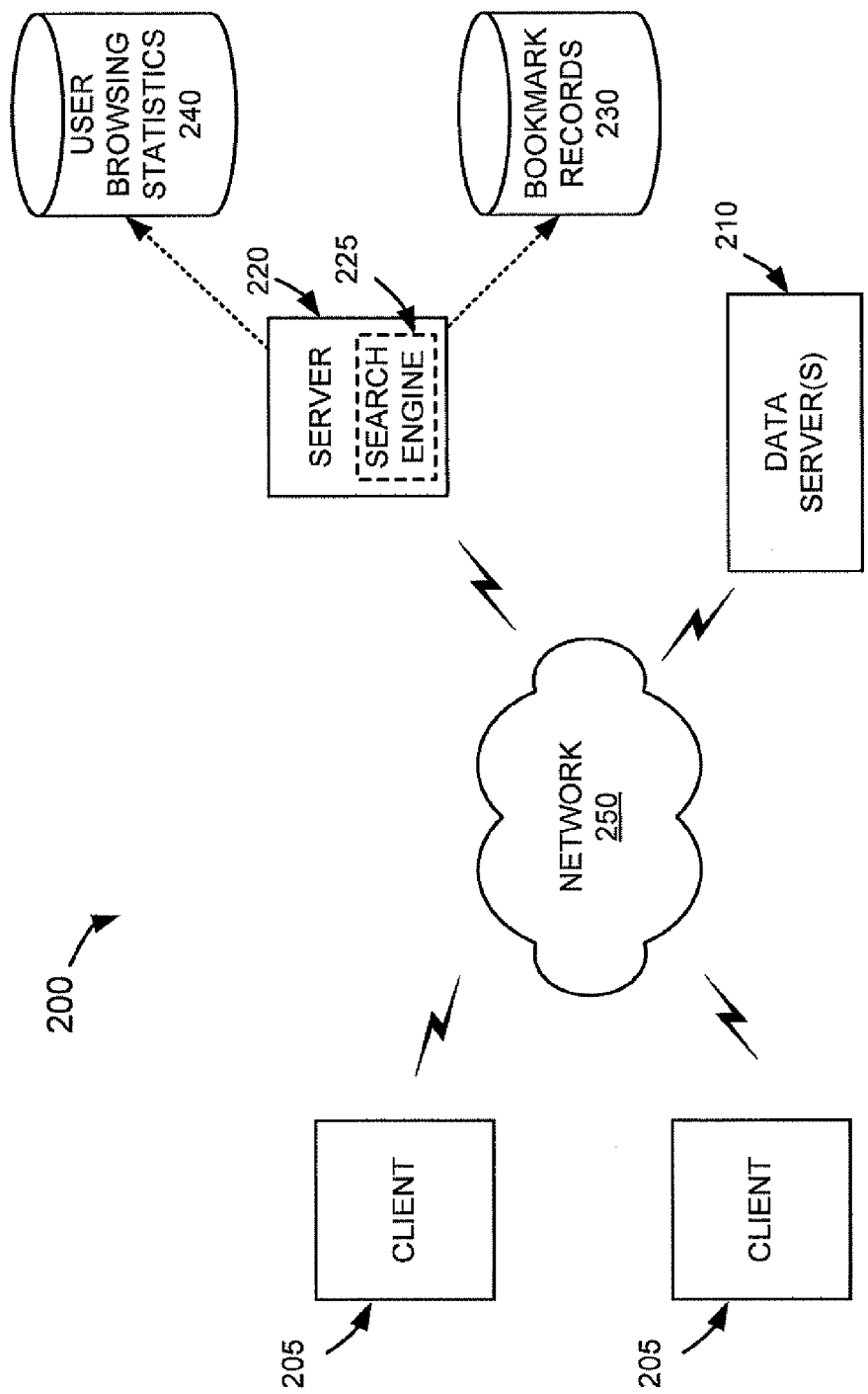
FIG. 2 is an exemplary diagram of a network in which systems and methods described herein may be implemented.

FIG. 2 is an exemplary diagram of a network 200 in which systems and methods described herein may be implemented. Network 200 may include multiple clients 205 connected to one or more servers 210 or 220 via a network 250. Two clients 205 and two servers 210 and 220 have been illustrated as connected to network 250 for simplicity. In practice, there may be more or fewer clients and servers. Also, in some instances, a client may perform one or more functions of a server and a server may perform one or more functions of a client.

Clients 205 may include client entities. An entity may be defined as a device, such as a personal computer, a wireless telephone, a personal digital assistant (FDA), a lap top, or another type of computation or communication device, a thread or process running on one of these devices, and/or an object executable by one of these devices. Clients 205 may implement a browser for browsing documents stored at servers 210 or 220. The browser may include a toolbar that includes bookmark functionality, as further described in detail below Server 220 may include a server entity that accesses, fetches, aggregates, processes, searches, and/or maintains documents. In accordance with one implementation, server 220 may include a search engine 225 usable by users at clients 205. Server 220 may implement a data aggregation service by crawling a corpus of documents (e.g., web pages) hosted on data server(s) 210, indexing the documents, and storing information associated with these documents in a repository of crawled documents. The aggregation service may be implemented in other ways, such as by agreement with the operator(s) of data server(s) 210 to distribute their documents via the data aggregation service. Search engine 225 may execute a search using a query, received from a user at a client 205, on the corpus of documents stored in the repository of crawled documents. Server 220 may provide, to a user issuing a query, a ranked list of documents related to the issued query. Server 220 may also store bookmarks, received from respective users at clients 205, in bookmarks records 230. The stored bookmarks may subsequently be retrieved by respective users at clients 205 via server 220. The storage of bookmarks at server 220, and subsequent retrieval, is described in co-pending U.S. application Ser. No. 11/327,644, the disclosure of which is incorporated by reference herein. Server 220 may also store user browsing statistics, obtained from user browsing activity at clients 205, in user browsing statistics 240.

Data server(s) 210 may store or maintain documents that may be crawled by server 220. Such documents may include data related to published news stories, products, images, user groups, geographic areas, or any other type of data. For example, server(s) 210 may store or maintain news stories from any type of news source, such as, for example, the Washington Post, the New York Times, Time magazine, or Newsweek. As another example, server(s) 210 may store or maintain data related to specific products, such as product data provided by one or more product manufacturers. As yet another example, server(s) 210 may store or maintain data related to other types of web documents, such as pages of web sites.

While servers 210 and 220 are shown as separate entities, it may be possible for one of servers 210 or 220 to perform one or more of the functions of the other one of servers 210 or 220. For example, it may be possible that servers 210 and 220 are implemented as a single server. It may also be possible for a single one of servers 210 and 220 to be implemented as two or more separate (and possibly distributed) devices.

Network 250 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network. Clients 205 and servers 210 and 220 may connect to network 250 via wired, wireless, and/or optical connections.

Exemplary Client/Server Architecture

Figure 3:
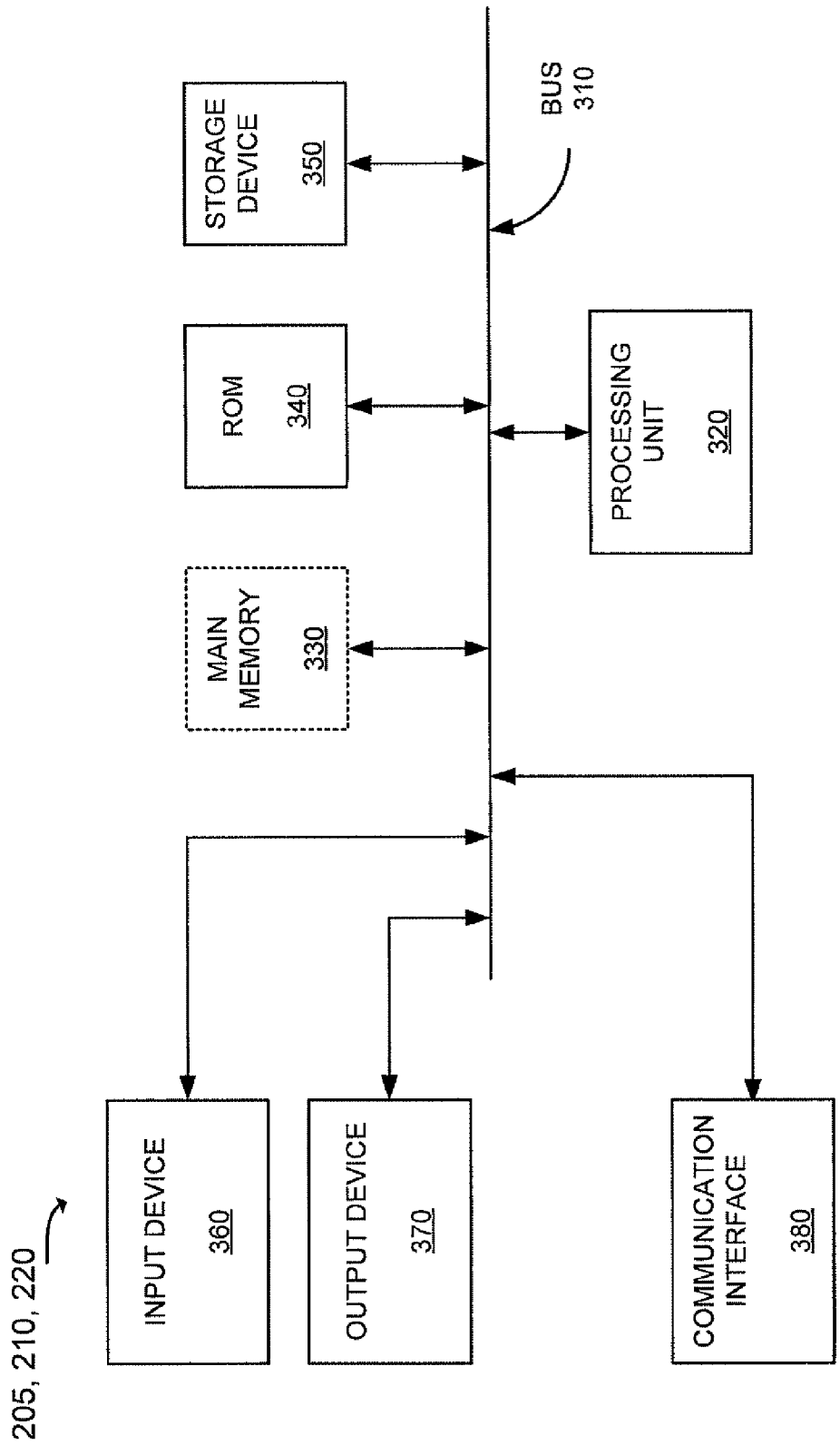
FIG. 3 is an exemplary diagram of a client or server of FIG. 2.

FIG. 3 is an exemplary diagram of a client or server entity (hereinafter called "client/server entity") which may correspond to one or more of clients 205 and/or servers 210 or 220. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

The client/server entity may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes described herein. Thus, implementations described herein are not limited to any specific combination of hardware circuitry and software.

Exemplary Client Toolbar

Figure 4:
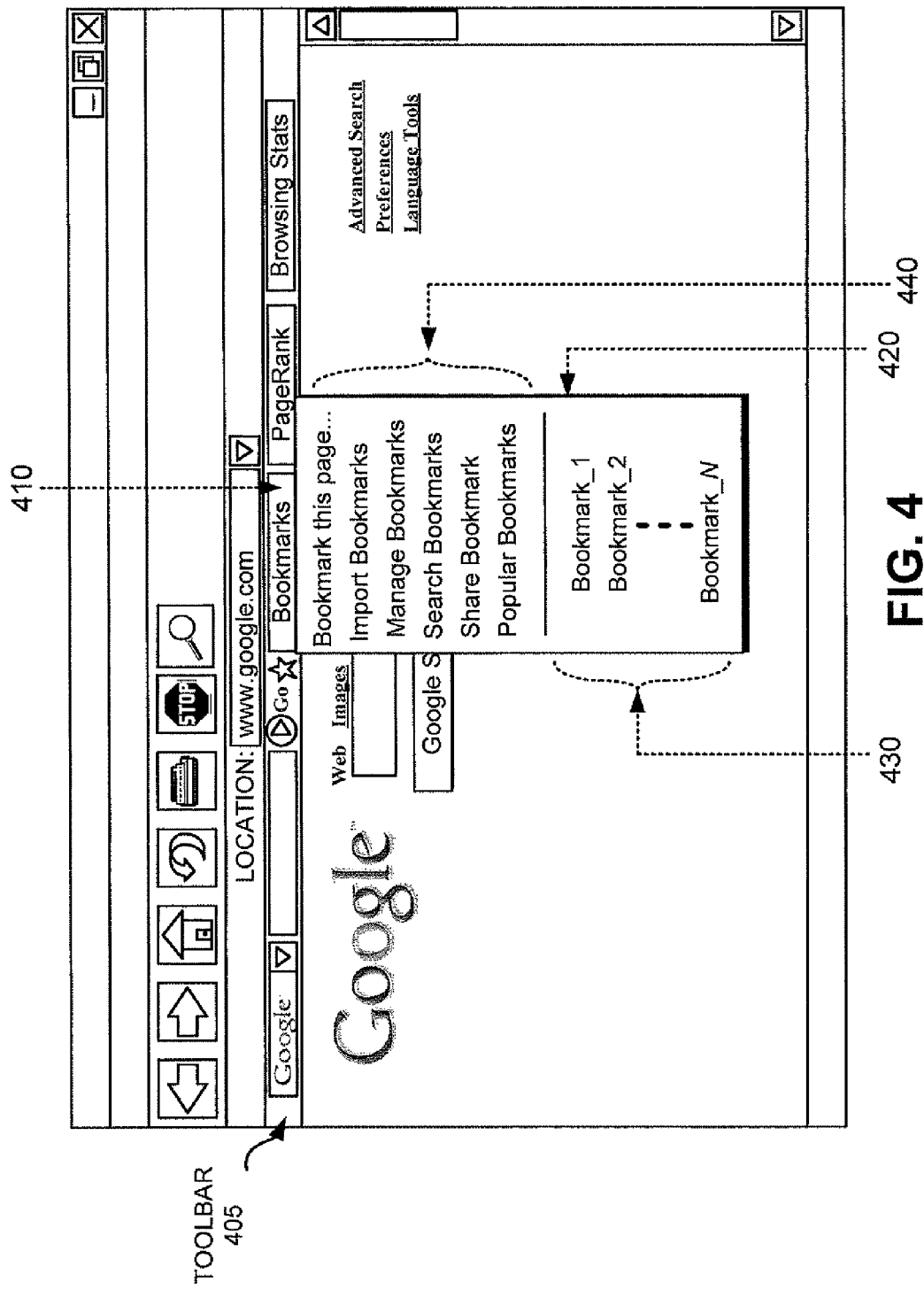
FIG. 4 is a diagram of an exemplary toolbar that includes bookmarks that may be stored at a remote server.

FIG. 4 is a diagram that depicts an exemplary toolbar 405 that may be implemented in a browser at a client 205. Toolbar 405 may be a standard toolbar of the browser or an add-on toolbar associated with the browser. Among other features, toolbar 405 may include a "bookmark" button 410, the selection of which by a user at client 205 may produce a bookmark window 420. Bookmark window 420 may include a list of multiple bookmarks 430 associated with the user, and multiple bookmark actions 440 that may be selected by the user. As shown, bookmark actions 440 may include "bookmark this page . . . " which adds a current document (e.g., a web page) browsed by a user to the list of bookmarks 430 and/or to the user's bookmark records stored in bookmark records 230 at server 220. Bookmark actions 440 may further include "import bookmarks," the selection of which imports bookmarks stored in association with a browser at client 205 into the user's bookmark records stored in bookmark records 230 at server 220. Bookmark actions 440 may also include "manage bookmarks," the selection of which permits the user to manage the user's server bookmarks in various ways. Bookmark actions 440 may further include "search bookmarks," the selection of which permits the user to search through the user's bookmarks stored in bookmark records 230 at server 220 using a user specified search query. Bookmark actions 440 may also include "share bookmark," the selection of which permits the user to share one or more of the user's bookmarks with other users via server 220. Bookmark actions 440 may further include "popular bookmarks," the selection of which permits the user to access bookmarks identified by server 220 as being popular among multiple different users. Bookmark actions 440 are described more fully in co-pending U.S. application Ser. No. 11/327,644.

Figure 5:
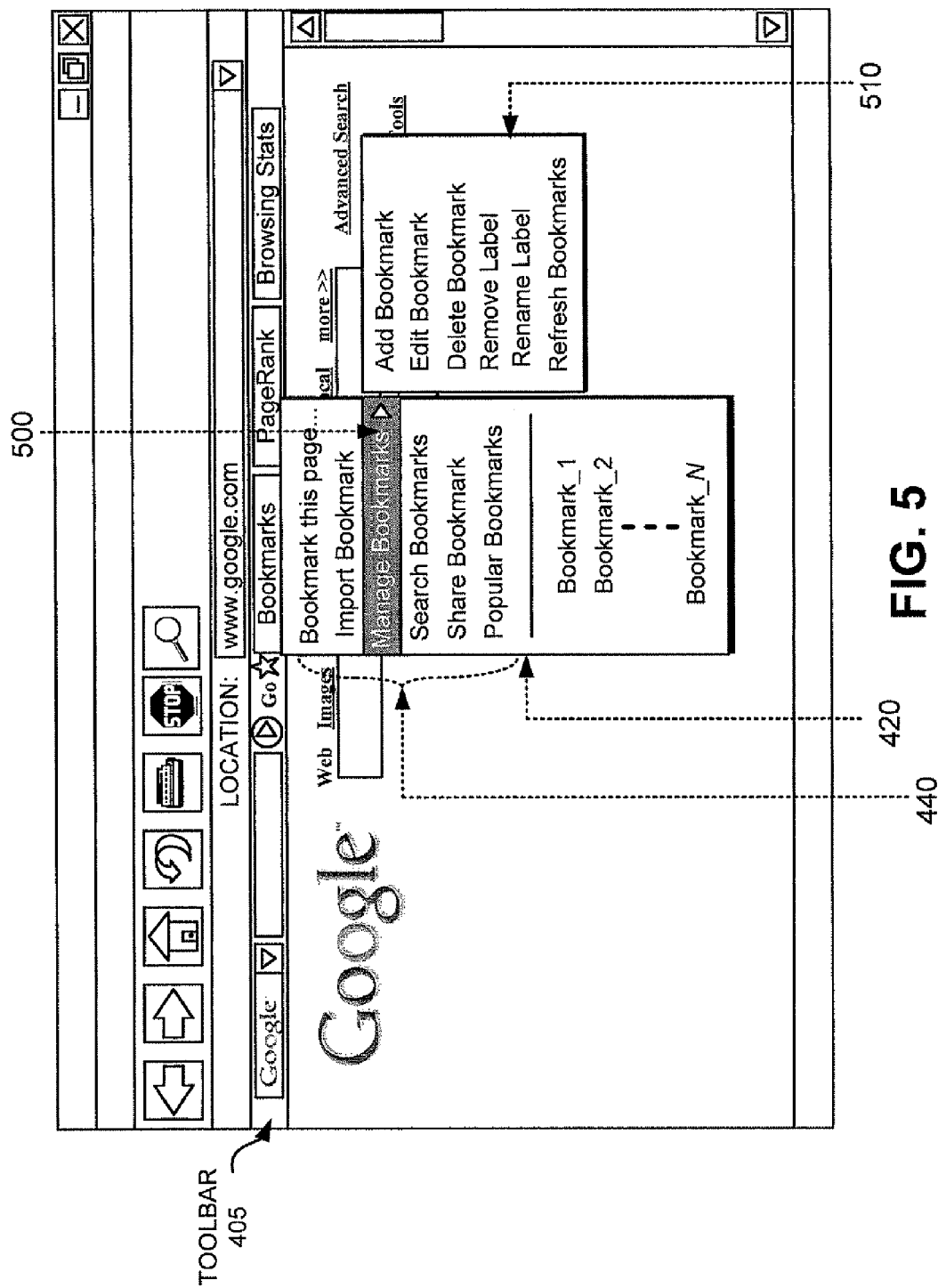
FIG. 5 is a diagram that depicts an exemplary bookmark management window on the toolbar of FIG. 4.

FIG. 5 is a diagram illustrating exemplary "manage bookmarks" actions 500, displayed in a window 510, which may be selected by a user from window 420 of toolbar 405 at client 205. The "manage bookmarks" actions 500 may include, for example, "add bookmark," "edit bookmark," "delete bookmark," "remove label," "rename label" and "refresh bookmarks" actions. A user at client 205 may select each of these bookmark management actions from window 510 (e.g., by clicking-on it using a mouse). Selection and use of bookmark actions from window 510 is described more fully in co-pending U.S. application Ser. No. 11/327,644

Figure 6:
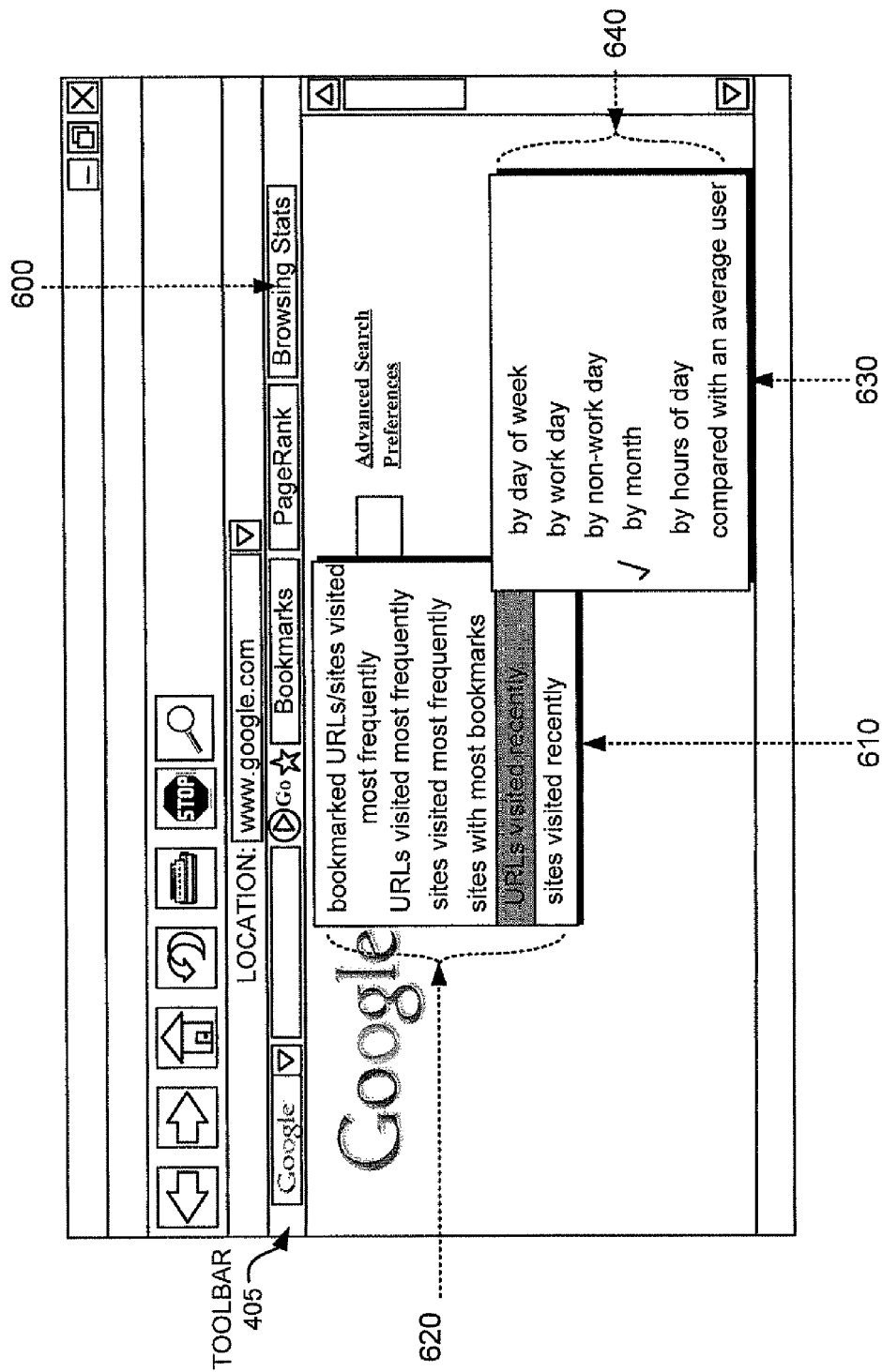
FIG. 6 is a diagram depicting user selection of specific browsing statistics to be provided to the user.

FIG. 6 is a diagram illustrating an exemplary "user browsing activity" selection window 610 that may be accessible to a user from toolbar 405. Window 610 may, for example, be accessed via user selection of "Browsing Stats" button 600 from toolbar 405. Window 610 may be used a user to select the content of the user browsing statistics that may be displayed to the user via a "zeitgeist" window.

Window 610 may display a number of various user browsing activity displaying options 620 that may be selected by a user. Browsing activity displaying options 620 may include, for example, "bookmarked URLs/sites visited most frequently," "URLs visited most frequently," "sites visited most frequently," "sites with most bookmarks," "URLs visited recently" or "sites visited recently" options. When any of the options displayed in window 610 are selected by a user (e.g., by clicking on the option with a mouse, or by "mouse over" of the option by the mouse), a "type of statistics" window 630 may be displayed to the user. Window 630 may include various display options 640 for selecting the type of statistic to be displayed to the user. For example, window 630 may include "by day of week," "by work day," "by non-work day," "by month," "by hours or day" or "compared with an average user" options. If, for example, the user selected the "by day of week" type of statistic from window 630, then the browsing statistics might include browsing activity displayed by each day of the week. For example, if the user selected "URLs visited most frequently" from window 620 and "by month" from window 630, then toolbar 405 might display the most frequently visited URLs as a function of month. Selection of the "by work day" option might display browsing activity as a function of work days (e.g., Monday through Friday). Selection of the "by non-work day" option might display browsing activity as a function of non-work days (e.g., Saturday and Sunday). Selection of the "by day of week" option might display browsing activity as a function of each day of the week. Selection of the "by hours of day" option might display browsing activity as a function of each hour of a day. Selection of the "compared with an average user" option might display a comparison of a user's browsing statistics with the browsing statistics associated with an average user (i.e., average browsing statistics determined across multiple users).

Exemplary Bookmark Records

Figure 7:
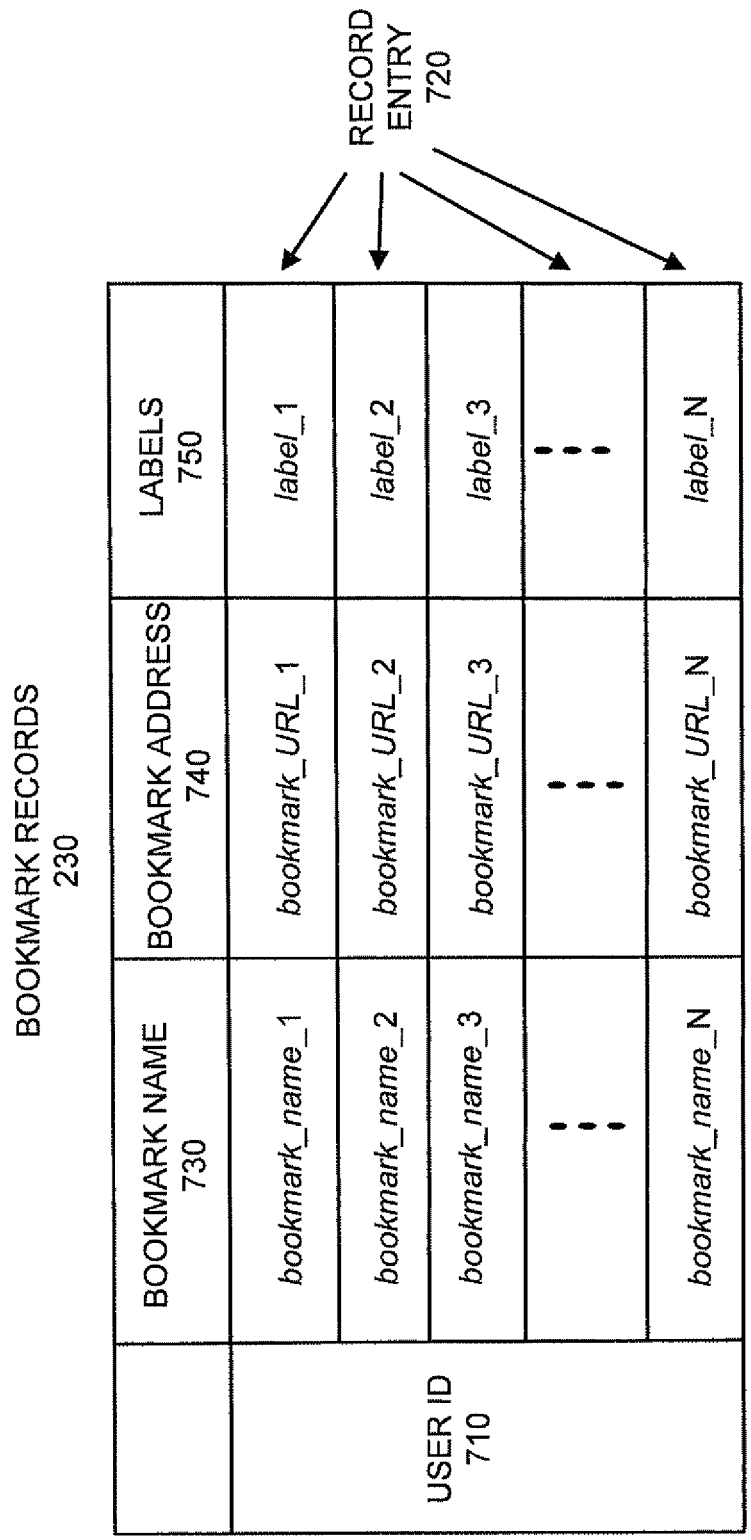
FIG. 7 is a diagram of exemplary bookmark records associated with a server of FIG. 2.

FIG. 7 illustrates exemplary bookmark records 230. Bookmark records 230 may include bookmarks received by server 220 from one or more users, with each user being identified by a different, unique user identifier (ID) 710. User ID 710 may include, for example, an Internet Protocol (IP) address associated with a user, a user log-in identifier, or any other type of unique data for identifying the user. As shown in FIG. 7, each user ID 710 may have one or more record entries 720 associated with it. Each record entry 720 may include a bookmark name 730, a bookmark address 740, and one or more labels 750. Bookmark name 730 may include any name designated by the user for the particular bookmark. For example, if a user bookmarks the document www.google.com, the user may name the bookmark "Google." Bookmark address 740 may include the address (e.g., URL) of the document bookmarked by the user. Labels 750 may include one or more different designated textual labels given by the user to the bookmark. When a client toolbar 405 requests a user's bookmarks from server 220, the user ID 710 associated with the user is used to retrieve associated record entries 720 from bookmark records 230. Server 220 may send the bookmark records associated with the user to the client that the user has logged in at such that the user may use the user's bookmarks at that particular client.

Exemplary Process for Providing Browsing Statistics to a User

Figure 8:
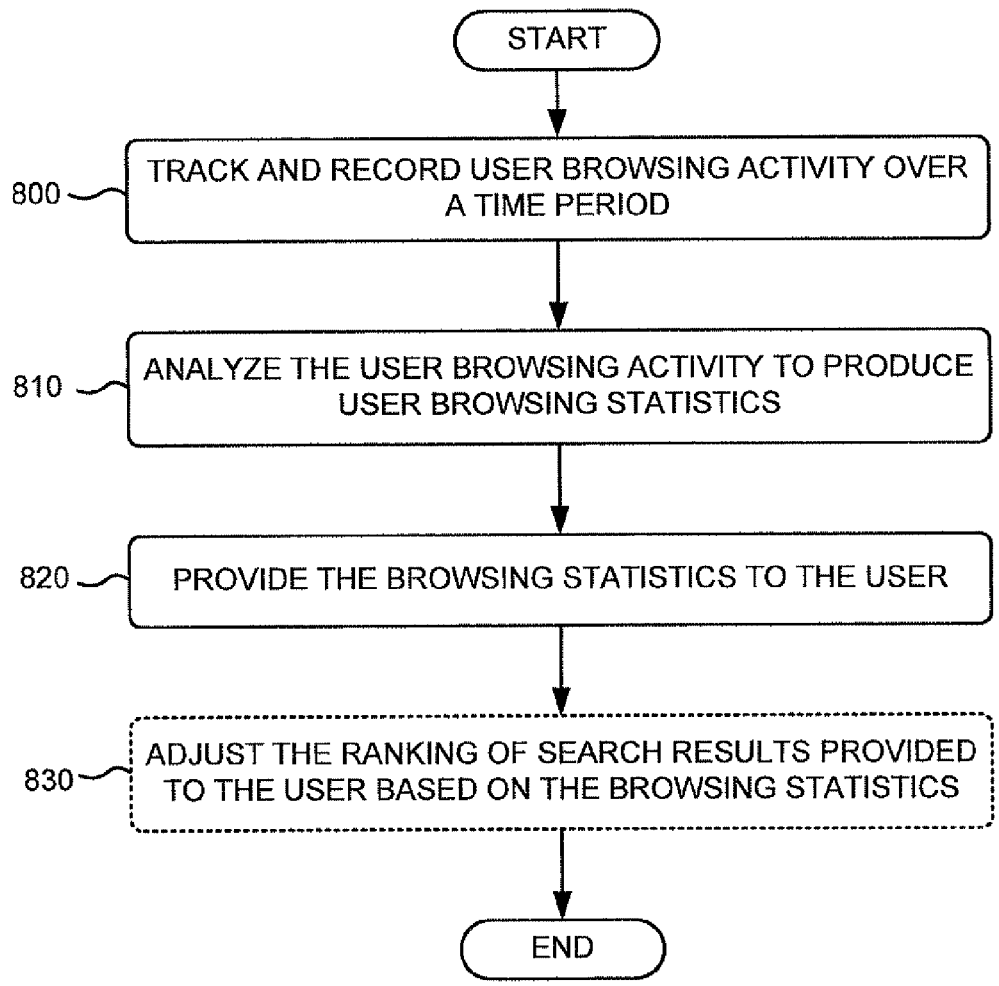
FIG. 8 is a flowchart of an exemplary process for providing user browsing statistics to a user.

FIG. 8 is a flowchart of an exemplary process for providing a user's browsing statistics to that user. The process exemplified by FIG. 8 may be performed by a toolbar 405 at a client 205.

Figure 9:
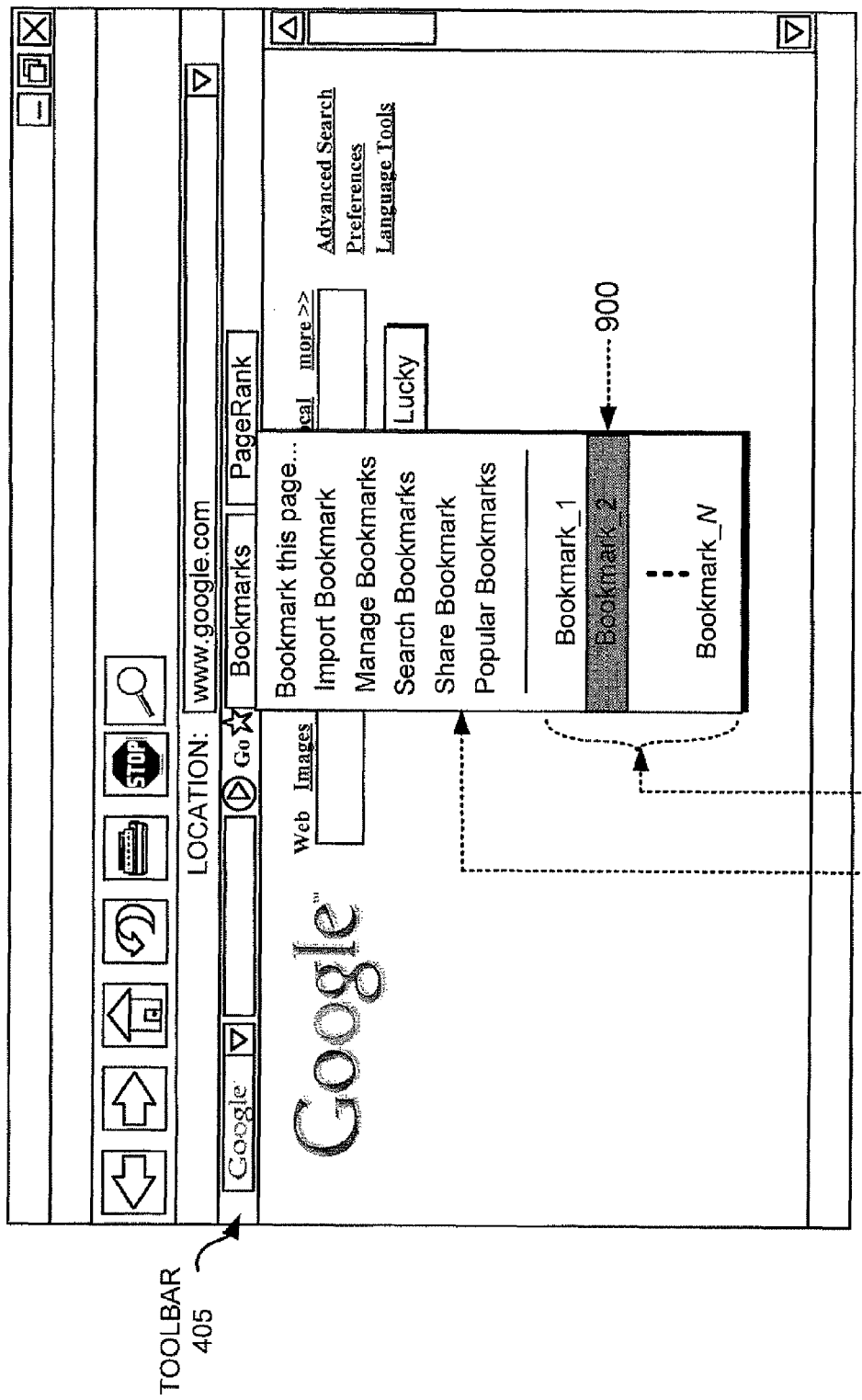
FIG. 9 illustrates the selection of a bookmark via the toolbar of FIG. 4.
Figure 10:
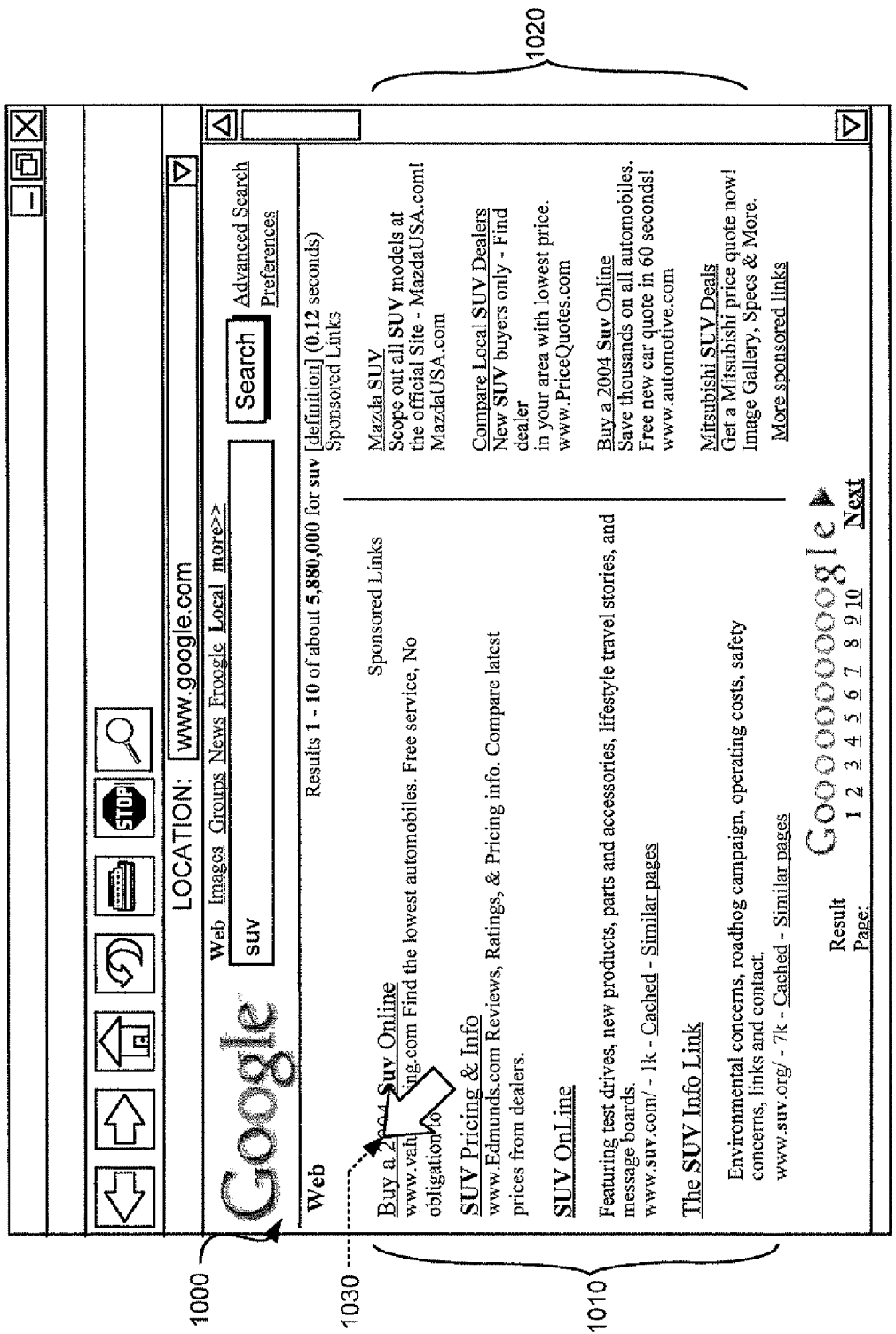
FIG. 10 illustrates user selection of a specific search result from a set of search results resulting from an executed search.

The exemplary process may begin with the tracking and recording of a user's browsing activity over a period of time (block 800). Toolbar 405 may maintain a record of each document accessed by an associated user. The record may include an identifier of the document (e.g., a URL) or a site associated with the document, and a timestamp associated with a time at which the document is accessed. Toolbar 405, for example, may track each bookmarked document accessed by a user. For example, as shown in FIG. 9, a user may select a bookmark 900 from a list of bookmarks 430 displayed in bookmark window 420 of toolbar 405. Toolbar 405 may record each selection of a bookmark 900 from bookmark window 420. As another example, toolbar 405 may track each search result selected by a user from a set of search results. As shown in FIG. 10, a search result document 1000 may be provided to a user from search engine 235 based on a search executed using a search query provided by the user. Search result document 1000 may include a list of search results 1010 that are relevant to the search query and, possibly, a list of advertisements 1020 that are relevant to the search query. The user may select 1030 one of the search results from the list of search results 1010 to access it. Toolbar 405 may record each selected result from search results 1010.

The user's browsing activity may be analyzed to produce browsing statistics for that user (block 810). The user browsing activity analysis may determine which bookmarked URLs or sites have been visited the most frequently by the user, which URLs or sites have been visited the most frequently by the user, which sites have the most user bookmarks (e.g., across multiple different users including the current user), and/or which URLs or sites have been visited recently by the user. The user browsing statistics produced by the analysis may be based on user selection from "user browsing activity" selection window 600 accessible to the user via toolbar 405, as described above with respect to FIG. 6. Window 600 may display a number of various user browsing activity displaying options that may be selected by a user.

Figure 11:
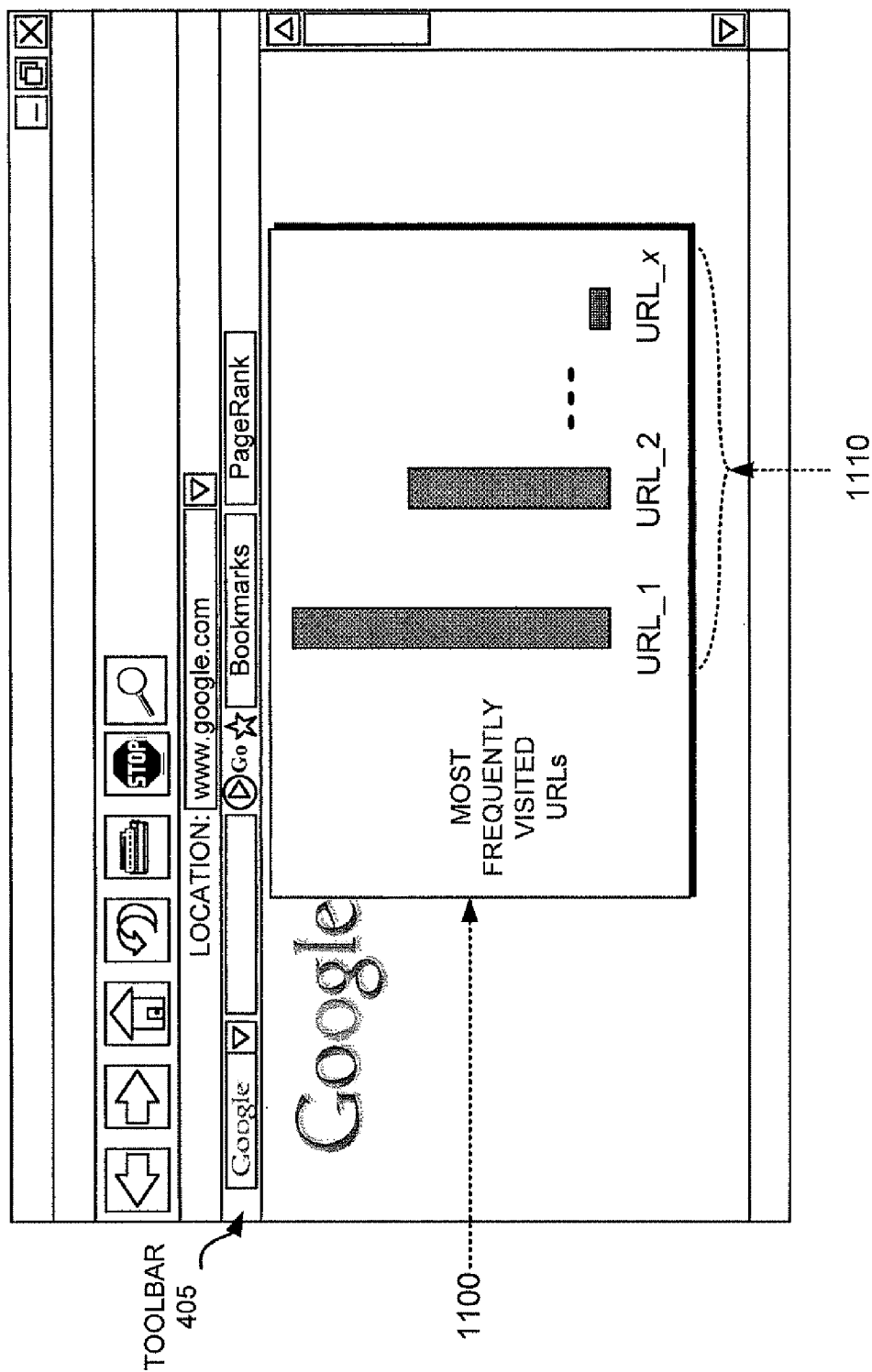
FIG. 11 illustrates a personalized display of a user's "most frequently visited URLs"
Figure 12:
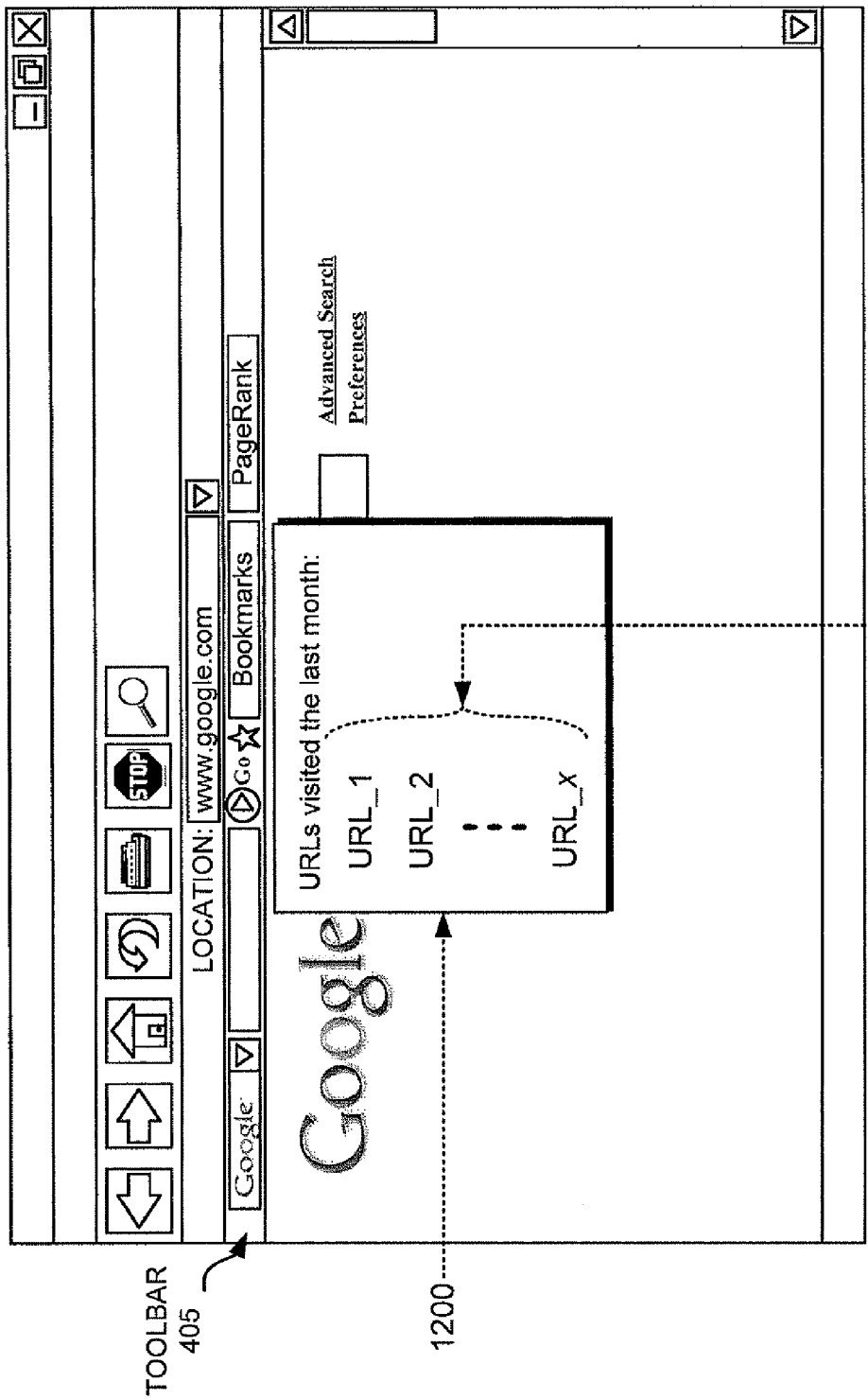
FIG. 12 illustrates the personalized display of the URLs visited by a user within the last month.
Figure 13:
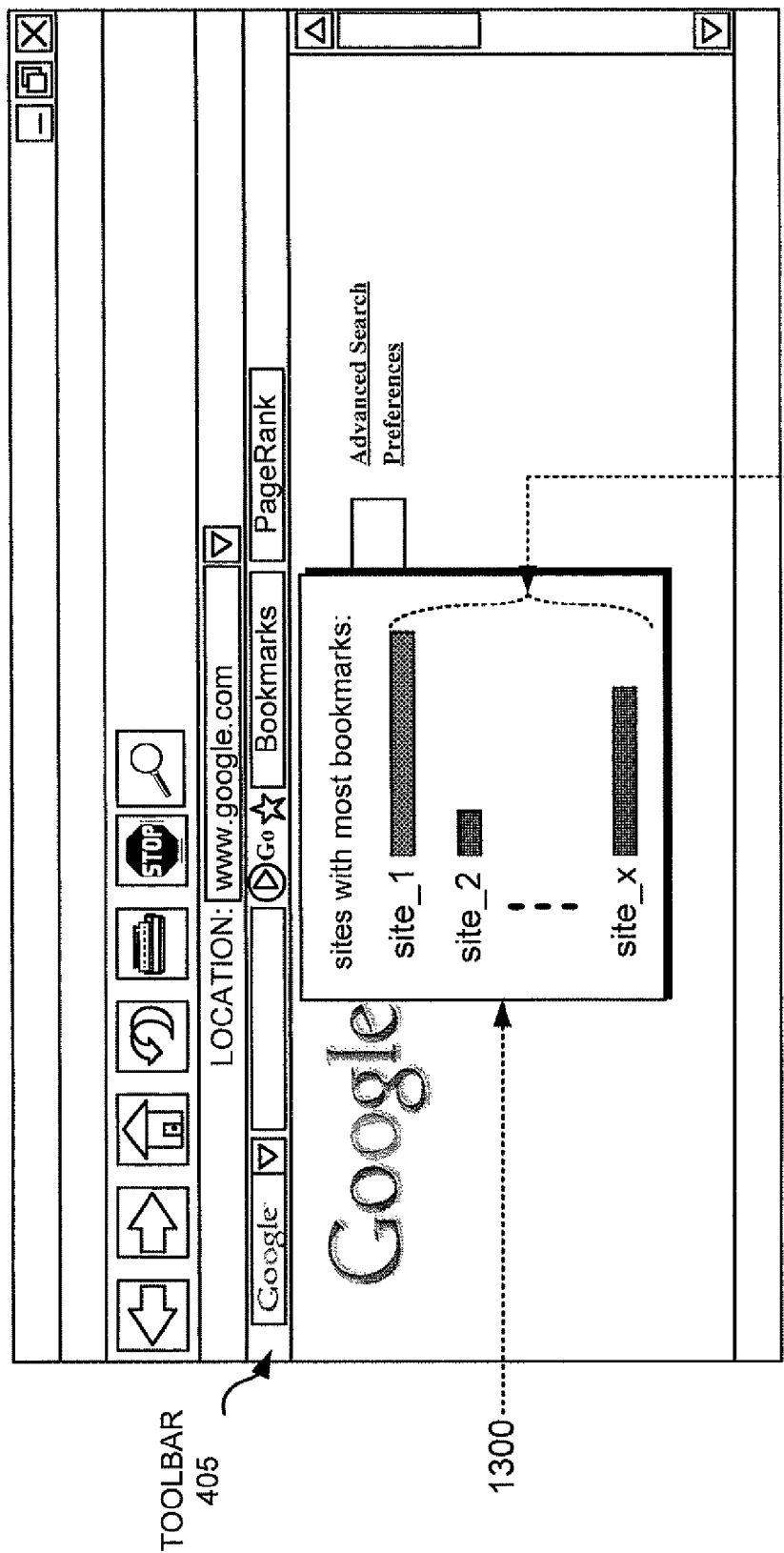
FIG. 13 illustrates the personalized display of sites with the most bookmarks browsed by a user.

The browsing statistics may be provided to the user (block 820). The browsing statistics may be provided to the user via toolbar 405 in a window (e.g., a pop-up "zeitgeist") that includes the browsing activity selected by the user, as described above with respect to FIG. 6. For example, as shown in FIG. 11, if the user has selected "URLs visited most frequently" from window 600, then toolbar 405 may display a window 1100 that provides a graphical representation 1110 of URLs (URL_1 through URL_x shown) visited the most frequently by the user. As further shown in the example of FIG. 12, if the user has selected "URLs visited recently" from window 600 and selected "by month" from window 620, then toolbar 405 may display a window 1200 that provides a graphical representation 1210 of URLs (URL_1 through URL_x shown) visited by the user during the last month. As additionally shown in the example of FIG. 13, if the user has selected "sites with most bookmarks" from window 600, then toolbar 405 may display a window 1300 that provides a graphical representation 1310 of sites which have the most bookmarks across multiple different users (i.e., including the current user).

The ranking of search results provided to the user may be adjusted based on the user's browsing statistics (optional block 830). Search results are typically ranked in a rank order using known techniques (e.g., based on relevance of, and/or links to or from, each of the search results). The user browsing statistics may be used to boost selected results among the search results or to adjust the ranking of the search results. For example, documents whose URLs are visited most frequently by a user may be boosted among a set of search results returned to that user as a result of an executed search. A user's browsing statistics may be provided from toolbar 405 to search engine 225 during a search and used by search engine 225 to adjust the ranking of search results returned to the user, or to adjust the ranking of search results returned to any other user. Alternatively, toolbar 405 may adjust the ranking and/or boosting or search results returned to the user at a client 205 from search engine 225.

CONCLUSION

The foregoing description of implementations consistent with principles of the invention provides illustration and description, but is not intended to be exhaustive or to limit the invention to the precise form disclosed. Modifications and variations are possible in light of the above teachings, or may be acquired from practice of the invention. For example, while series of acts have been described with regard to FIG. 8, the order of the acts may be modified in other implementations consistent with the principles of the invention. Further, non-dependent acts may be performed in parallel. Various types of browsing activity and browsing statistics have been described herein. Other types of browsing activity and browsing statistics would be apparent to those skilled in the art. The following are a few additional examples of browsing activity and/or browsing statistics: 1) browsing statistics may include trends not just for URLs or sites, but also for categories of interests (e.g., a user visits sites related to anti-depressant medication mainly on Monday mornings); 2) browsing statistics may include a frequency of visits to a URL or a site; 3) browsing statistics may include a comparison of browsing statistics associated with a user to other specified users (e.g., with these other users' permission) such as friends, contacts, colleagues or family members; 4) browsing statistics may include a comparison of browsing statistics for one category of interests or site to another category of interests or site; browsing statistics may include "top-N tables" that display the top N values for one or more various browsing statistics; 5) browsing statistics may be provided in various different chart forms (e.g., pie charts or graphs); 6) browsing statistics may include statistics regarding user queries associated with a user's browsing activity (e.g., average query length, average number result selections (e.g., clicks) per query, average number of queries per day, etc.); 7) browsing statistics may include statistics related to other browsing activity not described above, such as, for example, average document "stay time" (e.g., average time spent by a user viewing a document); and/or 8) browsing statistics may include a geographical plot of an estimated location of the sites that a user visits (e.g., based on IP addresses).

User browsing statistics 240 and bookmark records 230 are described herein as being stored in association with server 220. In some implementations, however, browsing statistics 240 and bookmark records 230 may be stored at a client 205.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   identifying, by a processor, documents selected by a user;
   analyzing, by a processor, information associated with accessing the selected documents, during a plurality of time periods, using a browser operating on a client computing device associated with the user;
   producing, by a processor and based on the information, a plurality of user browsing statistics that are particular to the client computing device and include values different from browsing statistics associated with other client computing devices;
   providing, by a processor and to the user, a listing associated with the plurality of user browsing statistics and the plurality of time periods;
   receiving, by a processor, a selection, by the user, of a particular browsing statistic of the plurality of user browsing statistics and a particular time period of the plurality of time periods;
   receiving, by a processor and from a search engine, search results associated with a search query, where the search results are ranked based on the search query;
   adjusting, by a processor, the ranking of the search results, based on the particular browsing statistic and the particular time period, to form adjusted search results; and
   causing, by a processor, the client computing device to present the adjusted search results.

2. The method of claim 1, where the plurality of user browsing statistics include one or more of:
   trends for document categories associated with the selected documents; or
   respective frequencies of accessing, using the browser, the documents.

3. The method of claim 1, further comprising:
   generating one or more chart forms that graphically depict the particular browsing statistic over the particular time period,
   where the one or more chart forms include at least one of pie charts or graphs.

4. The method of claim 1,
   where the selected documents are associated with one or more search queries associated with the user, and
   where the plurality of user browsing statistics further include statistics related to the one or more search queries.

5. The method of claim 4, where the statistics related to the one or more search queries include at least one of:
   an average query length associated with the one or more search queries,
   an average quantity of search result selections, by the user, from the one or more search queries, or
   a quantity of the one or more search queries associated with each of the plurality of time periods.

6. The method of claim 1, where the plurality of user browsing statistics further include respective average durations of accessing, using the browser, the selected documents.

7. The method of claim 1, further comprising:
   generating one or more chart forms that include a geographical plot of estimated locations of the selected documents based on network addresses associated with the documents, and
   where the method further comprises:
      causing the client computing device to present the geographical plot.

8. The method of claim 1, where analyzing the information comprises:
   analyzing information associated with selections, related to the selected documents, from a set of search results provided, using the browser, from the search engine.

9. The method of claim 1, where the selected documents include bookmarked documents, and
   where analyzing the information further includes:
      determining that a particular document accessed through the browser is one of the bookmarked documents; and
      recording information associated with accessing, using the browser, the particular document.

10. The method of claim 9, where the plurality of user browsing statistics further include a quantity of the bookmarked documents, accessed using the browser, during one or more of the plurality of time periods.

11. The method of claim 9, where the plurality of user browsing statistics are associated with accessing the bookmarked documents using the browser.

12. The method of claim 1, where one or more statistics, of the plurality of user browsing statistics, are associated with particular documents, of the selected documents, that are accessed, using the browser, more than a threshold frequency.

13. The method of claim 1, where the plurality of user browsing statistics further include respective quantities of the selected documents accessed, using the browser, during one or more of the plurality of time periods.

14. The method of claim 1, further comprising:
   identifying a document, of the plurality of selected documents, that is bookmarked on multiple client devices that include the client computing device and another client computing device that is not associated with the user,
   where one or browsing statistics, of the plurality of user browsing statistics, relate to accessing the identified document using the browser.

15. The method of claim 1, where the plurality of user browsing statistics further include statistics arranged by at least one of:

day of week,
work day, or
non-work day.

16. The method of claim 1, where the plurality of user browsing statistics further include statistics arranged by at least one of:
month of a year, or
hours of a day.

17. The method of claim 1, where the plurality of user browsing statistics further include one or more statistics arranged by cookie or by user agent associated with the client computing device.

18. The method of claim 1, further comprising:
comparing one or more statistics, of the plurality of user browsing statistics, the browsing statistics associated with other client computing devices to produce comparison data,
where reordering the search results is further based on the comparison data.

19. The method of claim 1, further comprising:
causing the client computing device to display, in a window that is independent of the browser, information associated with the plurality of user browsing statistics.

20. A method, comprising:
analyzing, by a processor, browsing activity, associated with a user, over a plurality of time periods;
producing, via a processor associated with the client computing device, a plurality of user browsing statistics based on the browsing activity that are particular to the client computing device and include values different from browsing statistics associated with other client computing devices;
providing, to the user, the plurality of user browsing statistics and the plurality of time periods;
receiving, from the user, information identifying one of the plurality of user browsing statistics and information identifying one of the plurality of time periods;
receiving, from the user, a search query;
sending the search query to a search engine;
receiving, from the search engine, search results associated with the search query;
sorting the search results based on the information identifying the one of the plurality of user browsing statistics and the information identifying the one of the plurality of time periods; and
providing the sorted search results to the user.

21. The method of claim 20, where analyzing the browsing activity associated with a user further comprises:
analyzing information associated with documents browsed by the user.

22. The method of claim 21, where the documents comprise bookmarked documents, and where the method further comprises:
identifying the bookmarked documents.

23. The method of claim 22, where the plurality of user browsing statistics further include a number of documents, visited during a most recent one of the plurality of time periods by the user, that correspond to the identified bookmarked documents.

24. The method of claim 22, where analyzing the browsing activity associated with the user further comprises:
analyzing information associated with documents selected by the user from the identified bookmarked documents.

25. The method of claim 20, where analyzing the browsing activity associated with the user further comprises:
analyzing information associated with documents selected by the user from a set of search results provided to the user from the search engine.

26. The method of claim 20, where the plurality of user browsing statistics further include statistics arranged by at least one of: month or hours of a day.

27. The method of claim 20, where the plurality of user browsing statistics further include statistics arranged by cookie or by user agent.

28. The method of claim 20, where the plurality of user browsing statistics further include statistics, determined for the user, compared to average browsing statistics determined for multiple users.

29. A method, comprising:
analyzing, by a processor and over a plurality of time periods, browsing activity of a user using a browser on a client computing device;
determining, by a processor associated with the client computing device, a plurality of browsing statistics, from the browsing activity, that are particular to the client computing device and include values different from browsing statistics associated with other client computing devices;
providing, to the user, a listing of the plurality of browsing statistics and the plurality of time periods;
receiving, from the user, a selection from the listing, where the selection includes information identifying one of the plurality of browsing statistics and information identifying one of the plurality of time periods;
graphically displaying to the user, via the client computing device and the browser, data related to the one of the plurality of browsing statistics and the one of the plurality of time periods;
receiving, from the user, a search query;
providing, to a search engine, the search query to a search engine;
receiving, from the search engine, search results associated with the search query; and
sorting, a ranking of the search results based on the selection of one of the plurality of browsing statistics and the one of the plurality of time periods.

30. The method of claim 29, where the plurality of browsing statistics further include documents visited most frequently by the user relative to all documents browsed by the user.

31. The method of claim 29, where the plurality of browsing statistics further include a number of documents visited, during a most recent one of the plurality of time periods, by the user.

32. The method of claim 29, where the plurality of browsing statistics further include an identification of a document that is bookmarked by multiple users, including the user.

33. The method of claim 29, where the plurality of browsing statistics further include statistics arranged by at least one of: day of week, work day, or non-work day.

34. The method of claim 29, where the plurality of browsing statistics further include statistics arranged by at least one of: month or hours of a day.

35. The method of claim 29, where the plurality of browsing statistics further include statistics arranged by cookie or by user agent.

36. The method of claim 29, where the plurality of browsing statistics further include statistics determined for the user compared to average browsing statistics determined for multiple users.

37. A system, comprising:
one or more client devices associated with a user, each of the one or more client devices comprising:
- a recording unit to record information associated with accessing the selected documents using a browser operating on the client device, over a plurality of time periods;
- a producing unit to produce a plurality of user browsing statistics based on the recorded information, where the plurality of user browsing statistics are particular to the client computing device and include values different from browsing statistics associated with other client computing devices;
- a providing unit to provide, to the user, a listing of the plurality of user browsing statistics and the plurality of time periods;
- a first receiving unit to receive, from the user, a selection from the listing, where the selection includes information identifying one of the plurality of types of the user browsing statistics and information identifying one of the plurality of time periods;
- a second receiving unit to receive, from the user, a search query;
- an adjusting unit to adjust a ranking of search results, associated with the search query, based on the information identifying the one of the plurality of types of user browsing statistics and the information identifying the one of the plurality of time periods;
- a third receiving unit to receive, from the user, information identifying another of the plurality of types of the user browsing statistics; and
- an re-adjusting unit to re-adjust the adjusted ranking of search results, associated with the search query, based on the information identifying the other of the plurality of types of user browsing statistics.

38. A non-transitory client computer-readable memory device that stores instructions, comprising:
instructions, which when executed by a processor, cause the processor to analyze information associated with accessing document, over a plurality of time periods, using a browser operating on a client device associated with a user;
instructions, which when executed by a processor, cause the processor to produce, based on analyzing the information, one or more user browsing statistics that are particular to the client computing device and include values different from browsing statistics associated with other client computing devices;
instructions, which when executed by the processor, cause the processor to receive, from the user, a selection of one of the plurality of time periods;
instructions, which when executed by the processor, cause the processor to receive search results from a search engine;
instructions, which when executed by the processor, cause the processor to adjust a ranking of the search results, based on the one or more user browsing statistics during the selected one of the plurality of time periods, to form adjusted search results; and
instructions, which when executed by the processor, cause the processor to provide the adjusted search results using the client device.

39. The non-transitory memory device of claim 38, where the instructions to produce the one or more browsing statistics further include:
instructions to produce one or more particular user browsing statistics associated with particular documents, of the documents, where the particular documents are accessed, using the browser, more than a threshold frequency.

40. The non-transitory memory device of claim 38, where the instructions to produce the one or more browsing statistics further include:
instructions to produce one or more user particular browsing statistics associated with respective quantities of times that the documents are accessed, using the browser, during the plurality of time periods.

41. The non-transitory memory device of claim 38, where the instructions to produce the one or more browsing statistics further include:
instructions to identify a document, of the plurality of documents, that is bookmarked on multiple client devices that include the client device and another device that is not associated with the user, and
instructions to produce one or more user particular browsing statistics related to accessing the identified document using the browser.

42. The non-transitory memory device of claim 38, where the instructions to produce the one or more browsing statistics further include:
instructions to produce one or more user particular browsing statistics arranged by at least one of:
hours of a day,
day of a week, or
months of a year.

* * * * *

UNITED STATES PATENT AND TRADEMARK OFFICE
CERTIFICATE OF CORRECTION

| | | |
|---|---|---|
| PATENT NO. | : 8,548,991 B1 | Page 1 of 1 |
| APPLICATION NO. | : 11/536779 | |
| DATED | : October 1, 2013 | |
| INVENTOR(S) | : Zamir et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 643 days.

Signed and Sealed this
Third Day of March, 2015

Michelle K. Lee
*Deputy Director of the United States Patent and Trademark Office*